Figure 1:
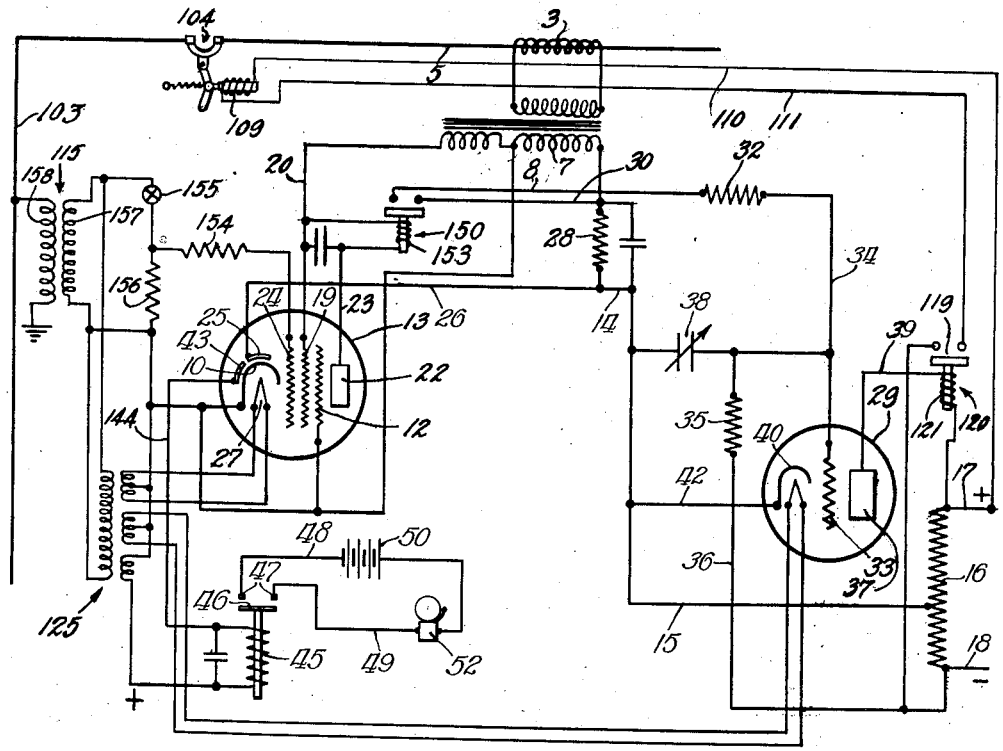

Feb. 21, 1939.　　　　R. I. WARD　　　　2,148,145
DIRECTIONAL POWER RELAY
Filed Dec. 9, 1935

Inventor:
Robert I. Ward
By:
Attys.

Patented Feb. 21, 1939

2,148,145

UNITED STATES PATENT OFFICE 2,148,145

DIRECTIONAL POWER RELAY

Robert I. Ward, Chicago, Ill.

Application December 9, 1935, Serial No. 53,569

2 Claims. (Cl. 250—27)

This invention is a continuation in part of my copending application, Serial No. 743,979, filed September 14, 1934, now matured into Patent No. 2,023,653, of December 10, 1935, and is directed particularly to a power control relay comprising a thermionic tube employed to control the timing circuit of a control tube connected for operating a circuit breaker or the like.

In its broader aspects, the present invention contemplates a control relay comprising a thermionic tube having a plate circuit and a negatively biased grid, a second thermionic tube responsive to predetermined changes or variations in condition of an external alternating circuit to initiate actuation of a timing circuit connected to the grid of the first tube, and a rectifying circuit controlled by the second tube supplying positive direct current through the timing circuit to overcome the negative bias on the grid of the first tube, thereby allowing operative plate current flow through the plate circuit of the first tube.

This particular type of control relay has wide application in the protection and control of alternating current distribution systems, and alternating current circuits in which such control and protection against overload, fault conditions or reversal of power flow are desired.

The primary object of the present invention is the provision of a control relay circuit of this type in which a predetermined time delay can be effected in the operation of the control circuit after occurrence of a condition in the external alternating current circuit requiring operation of the protection means. In connection with this feature, there is provided a control relay which not only initiates operation of the timing circuit, but also delivers a rectified direct current of positive potential to overcome the negative bias on the grid of the operating tube. In addition, I provide means also included in the control relay for indicating the life characteristics of this relay, so that a forewarning of its proximate breakdown is given to preclude breakdown of the protective control circuit at a time when its operation may be required.

In order to achieve these functions, it has been necessary to design the tube in a novel manner with respect to the interrelation of its operating elements, and another object of my present invention is to provide a single tube constructed in such manner and designed to produce the required operating characteristics, without materially affecting its size, capacity or cost.

Other objects and advantages of the present invention will be more apparent from the following detailed description which, taken in conjunction with the accompanying drawing, will disclose to those skilled in the art the particular construction and operation of a preferred form of the present invention.

Figure 2:
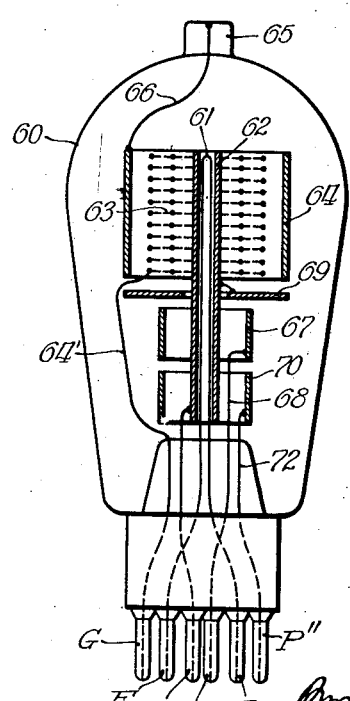

In the drawing:

Figure 1 is a diagrammatic circuit illustrating one application of the present invention; and Figure 2 is a view of a tube construction which may be employed in the present invention.

Referring now in further detail to Figure 1 of the drawing, I provide a line 2 connected to one phase of a polyphase alternating current circuit or the like, which is provided with a current transformer 3 of standard type. The current transformer 3 is connected across the primary winding 4 of a special saturating transformer, shown generally at 5, having a secondary winding 7. One terminal of the secondary winding 7 is connected through conductor 9 to the suppressor grid 12 of a power relay control tube 13 and is also connected to the cathode 10 of this tube. The transformer 5 is so designed that its core saturates when the current flow in the line 2 exceeds a predetermined value, thereby definitely limiting the voltage available across the terminals of the secondary winding 7. The other terminal of the secondary winding 7 is connected to the resistance 16 through conductors 14 and 15, the resistance 16 being interposed between a positive bus 17 and a negative bus 18 of a direct-current supply circuit.

The control tube 13 is provided with a screen grid 19, connected through conductor 20 to one terminal of a secondary winding 152 of the transformer 5, and a plate 22, connected through conductor 23 to one terminal of the operating winding 153 of the relay 150, the other terminal of this winding being connected to the same terminal of the secondary winding 152 as is the screen grid 19. The relay 150 is provided with contact members 149 which serve to connect the resistor 28 through conductors 30 and 8 to the resistor 32 to apply thereto a positive biasing potential for overcoming the negative potential applied to the grid 33 from the resistor 16. A control grid 24 is also provided in the tube 13 for controlling the flow of electrons between the cathode 10 and the plate 22. The control grid 24 is connected through a resistor 154 to the common connection between a lamp 155 and resistor 156 which are connected across a secondary winding 157 of a transformer 115, the primary winding 158 of which is connected between ground and a line 103 of a three-phase grounded neutral alternating current system. The resistor 156 is also connected to the cathode 10. A suitable filament 27 is provided in the tube 13 for heating the cathode 10.

The line 103 may be connected to the line 2 through a circuit breaker 104 provided with a trip coil 109. The trip coil 109 may be connected through conductors 110 and 111 for energization between the conductors 17 and 18 by contact members 119 of a relay 120, the operating winding 121 of which is arranged to be energized in a manner that will be presently set forth.

The tube 13 is also provided with a plate 25 spaced from the cathode 10 to rectify the alternating current from the secondary winding 7 of the saturating transformer 5 so that direct current will continuously flow through the resistor 28. This circuit may be traced from the plate 25 through conductor 26, resistor 28, winding 7, and conductor 9 to the cathode 10.

As described in detail in my copending application, Serial No. 573,754, filed November 9, 1931, now Patent 2,047,343, the control grid 24 normally prevents electron flow between the cathode 10 and the plate 22. Such flow is prevented because of the phase relation between the voltage applied to the plate 22 and the voltage applied to the control grid 24 during normal operation of the alternating current system including the lines 2 and 103.

Referring now to the timing circuit for the control relay disclosed in Figure 1, the resistor 28 is arranged to be connected, through the conductor 30, contact members 149 and conductor 8 to the resistor or grid leak 32, which in turn is connected to the grid 33 of the tube 29 through the conductor 34. However, the grid 33 is also connected through resistor 35 and conductor 36 to the negative bus 18. Therefore, during normal operation of the circuit, the negative operating bus 18 supplies a negative potential through conductor 36 and resistance 35 to the grid 33, maintaining this grid at a predetermined negative potential such that insufficient current is permitted to flow through the relay tube 29 and the plate 37 for energizing the winding 121 of the relay 120 which may be set for operation upon a predetermined current flow through the plate circuit of the tube 29.

On the occurrence of a fault on the line 2, the voltage across the secondary winding 7 of the transformer 5 moves out of its normal phase relationship with respect to the voltage impressed on the grid 24 of the tube 13 and electrons are permitted to flow between the cathode 10 and the plate 22. The winding 153 of the relay 150 is energized and, at contact members 149, a circuit is completed from resistor 28 through conductors 30 and 8 to the resistor 32 of the timing circuit for the valve 29. The direct current potential across the resistor 28 is transferred, by means of the conductor 30, contact members 149 and conductor 8 to the resistor 32, and thence through conductor 34 to the grid 33 of the tube 29.

The increasing positive potential impressed upon the grid 33 in this manner serves to counteract the negative bias provided by the bus 18 and conductor 36, and thereby overcomes the negative potential on the grid 33. The rate at which the positive direct current potential from the plate 25 of the tube 13 is increased above the negative potential, which may be of any predetermined value, is controlled by the variable condenser or capacitor 38, or resistor 32, which are connected between the grid 33 and the conductor 15 leading to the resistance 16. This condenser may be of the tapped type, or of the variable type. The capacitance of the condenser, being adjustable, serves to adjust the time period within which the positive direct current potential from the rectifying circuit controlled by plate 25 in tube 13 is increased to an extent such as to allow current flow from the plate 37 through the conductor 39 connected thereto and through the operating winding 121 controlled by current flow through the plate 37. This will produce sufficient current flow, after a predetermined period of time determined by the setting of the variable condenser 38 and the resistor 32, to effect energization of winding 121 and bridging of contact members 119 to energize the trip coil 109 for opening the circuit breaker 104.

The suppressor grid 12, in the circuit shown in Figure 1, acts to prevent the secondary electrons from the plate 22 returning to the cathode 10, while the screen grid 19, which is connected to an external alternating current circuit, serves, in effect, to reduce the space charge between the cathode and plate and thereby acts as a booster grid. The tube 29 is provided with a cathode 40, which may be directly connected through the conductor 42 to the conductor 15 leading to the resistance 16.

I have also provided, in the circuit shown in Figure 1, the tube 13 with an additional plate 43, which plate is connected through the conductor 44 to the winding 45 of a mechanical type relay having an armature 46 actuated by the winding 45. The relay 46 is adapted to bridge across contacts 47 carried by the conductors 48 and 49 connected through the battery 50 to an alarm device 52 for indicating the life characteristics of the tube 13.

In Figure 2 I have disclosed a multiple element tube of the high vacuum type, which may be employed in place of the tube 13, and which is specially constructed to provide the particular features and functions required of a directional or overload control relay of this type. The tube shown in this embodiment of the invention is provided with an envelope 60 of glass or the like, within which is mounted a heater 61 comprising an electric filament which terminates at the prongs marked F—F, and which serves to heat the cathode 62 surrounding the filament, the cathode 62 being connected to the prong marked C. The tube is also provided with a grid 63 which is connected through the conductor 64' to the prong marked G, and is provided with the usual type of plate 64 connected to the terminal 65 at the upper part of sealing envelope 60 by the conductor 66, the grid 63 and plate 64 forming the usual plate and grid of three element tubes of the known type.

The tube is also provided with a plate 67, spaced from and surrounding the lower end of the cathode 62, and connected through the conductor 68 to the prong marked P'. The plate 64 is of the usual construction and may be of any one of a number of preferred forms known in the art. As shown, it comprises a metal cylinder surrounding the grid 63 and the cathode 62 adjacent the upper end thereof. The plate 67 is, similarly, of cylindrical form, but substantially smaller than the plate 64, and is electrically separated from the plate 64, both of the plates being of course electrically separate from the cathode 62. A suitable metal shield plate 69 is interposed between the plate 64 and the plate 67, the shield 69 being electrically connected to the cathode 62 by means of an internal connection at any desired point. The internal connection may extend directly to the cathode, or it may extend to the conductor that connects the prong C with the cathode. The shield 69 effectively prevents any interaction between the circuit of the plate 67 and the circuits of the grid 63 and of the plate 64. A second plate 70, corresponding in form to the plate 67, is also disposed about the cathode 62 adjacent the lower end thereof, and is connected through the conductor 72 to a prong marked P''.

The plates 67 and 70 correspond to the plates 43 and 25 of the tube 13 shown in Figure 1, one of these plates being connected to the life indicating circuit through its corresponding prong, and the other of the plates being connected to one leg of the saturating transformer 7 to act as a half wave rectifier and to supply positive direct current potential to the grid 33 of the tube 29. Either one of the plates 67 or 70 may be connected to either of the circuits, as desired. It is to be pointed out that the capacity of these plates must be such as to pass a current of substantially 15 milliamperes or greater, in order to insure operation of the circuits controlled by these plates.

The shield 69 effectively shields both of the plates 67 and 70 from the normal plate and grid circuits of the tube, whereby the circuits controlled by the plates 67 and 70 are electrically separate from and are not affected by the operation of the circuit passing through the normal plate and grid. Thus the tube 60 is capable of embodying, in one and the same envelope, both the normal functions of a high vacuum tube, and also the rectifying plate and a life indicator plate controlling circuits respectively connected as described in connection with Figure 1.

It is therefore believed apparent that I have provided a control relay construction which is capable of functioning to give a positive protection and control characteristic to the operation of the tube 29, and at the same time controls the effective time delay which may be required between the occurrence of a fault, overload or reversal of power flow and the operation of the circuit controlling means controlled by the tube 29.

I am aware that various modifications may be made in the present invention without departing from the scope and spirit thereof, and I therefore intend to be limited only as defined by the scope and spirit of the appended claims.

I claim:—

1. A control system comprising, in combination, a load circuit; an electric valve including an anode, a cathode and a control electrode connected to control the energization of said load circuit; means for negatively biasing said control electrode to render said valve non-conducting, a timing circuit connected to said control electrode, a resistor, circuit means connecting said resistor to a source of alternating current, rectifying means interposed in said circuit means and disposed to permit only direct current to flow therethrough, and switch means connected between said timing circuit and said resistor in such manner as to apply a positive bias to said timing circuit on closure of said switch means whereupon the negative bias on said control electrode is overcome and said valve is rendered conducting whereby said load circuit is energized a predetermined time after closure of said switch means.

2. A control system comprising, in combination, a load circuit; a first electric valve including an anode, a cathode, and a control electrode connected to control the energization of said load circuit; means for negatively biasing said control electrode to render said first valve non-conducting, a timing circuit connected to said control electrode, a resistor, circuit means connecting said resistor to a source of alternating current; a second electric valve including an anode, a cathode, a control electrode, and an auxiliary anode adjacent the cathode, the cathode and auxiliary electrode being connected between said resistor and said source of alternating current for permitting only direct current to flow therethrough; a second relay having normally open contact members connected between said timing circuit and said resistor in such manner as to apply a positive bias to said timing circuit on closure of said contact members and an operating winding connected to be controlled by said second electric valve; and means for controlling the energization of the control electrode of said second electric valve for controlling the energization of the winding of said second relay whereby said contact members are closed and the negative bias on said control electrode is overcome and said second electric valve is rendered conducting to energize said load circuit a predetermined time after said contact members are closed.

ROBT. I. WARD.